(12) United States Patent
Goodzeit

(10) Patent No.: US 6,851,651 B2
(45) Date of Patent: Feb. 8, 2005

(54) CONSTELLATION OF SPACECRAFT, AND BROADCASTING METHOD USING SAID CONSTELLATION

(75) Inventor: Neil Evan Goodzeit, Princeton, NJ (US)

(73) Assignee: Lockheed Martin Corporation, Bethesda, MD (US)

(*) Notice: Subject to any disclaimer, the term of this patent is extended or adjusted under 35 U.S.C. 154(b) by 26 days.

(21) Appl. No.: 10/176,936

(22) Filed: Jun. 21, 2002

(65) Prior Publication Data

US 2003/0155468 A1 Aug. 21, 2003

Related U.S. Application Data

(60) Provisional application No. 60/356,775, filed on Feb. 15, 2002.

(51) Int. Cl.$^7$ .................................................. B64G 9/00
(52) U.S. Cl. .................. 244/158 R; 244/164; 244/171; 455/427
(58) Field of Search ............................ 244/158 R, 171, 244/164; 455/427, 428, 12.1, 13.2; 701/226; 342/356

(56) References Cited

U.S. PATENT DOCUMENTS

| 4,943,808 A | 7/1990 | Dulck et al. | 342/356 |
| 6,223,019 B1 * | 4/2001 | Briskman et al. | 455/12.1 |
| 6,564,053 B1 * | 5/2003 | Briskman et al. | 455/427 |
| 2002/0177403 A1 * | 11/2002 | LaPrade et al. | 455/12.1 |

* cited by examiner

Primary Examiner—Peter M. Poon
Assistant Examiner—Timothy D Collins
(74) Attorney, Agent, or Firm—Duane Morris LLP

(57) ABSTRACT

In general, a constellation of spacecraft is used to broadcast to a particular region with high angles of view in order to reduce blockage or shadowing. A constellation of a plurality of spacecraft is placed in 24-hour orbits having inclination of about 55°, eccentricity of about 0.32, semi-major axis of about 42,000 km, longitude of the ascending node of about 43° East, argument of perigee of about 270°, and longitude of the ground track at maximum latitude of about 7° East. The preferred number of spacecraft ranges from three to six. In a particular application of Digital Audio Broadcast to Europe in some embodiments, the most populous cities are provided with service from no more than about 10° from vertical, and broadcast takes place when the spacecraft are above at least 35° North latitude. The broadcast power is reduced during those portions of the orbit in which the ground track lies in the Southern hemisphere.

19 Claims, 7 Drawing Sheets

| RANKING | LAT | LON | WEIGHTING FACTOR | LOCATION |
|---|---|---|---|---|
| 1 | 51.50 | -0.15 | 1.00 | LONDON |
| 2 | 48.12 | 11.46 | 0.96 | MUNCHEN |
| 3 | 52.56 | 13.22 | 0.96 | BERLIN |
| 4 | 48.85 | 2.22 | 0.92 | PARIS |
| 5 | 55.75 | -4.33 | 0.50 | GLASGOW |
| 6 | 52.50 | -2.00 | 0.50 | BIRMINGHAM |
| 7 | 52.43 | 4.79 | 0.50 | AMSTERDAM |
| 8 | 51.17 | 6.71 | 0.48 | DUSSELDORF |
| 9 | 48.80 | 9.14 | 0.48 | STUTTGART |
| 10 | 43.41 | 5.29 | 0.46 | MARSEILLE |
| 11 | 45.47 | 9.16 | 0.45 | MILAN |
| 12 | 41.85 | 12.42 | 0.45 | ROME |
| 13 | 40.90 | 14.20 | 0.45 | NAPLES |
| 14 | 50.84 | 4.29 | 0.37 | BRUSSELS |
| 15 | 44.45 | 8.77 | 0.23 | GENOA |
| 16 | 38.12 | 13.32 | 0.23 | PALERMO |
| 17 | 46.99 | 7.38 | 0.22 | BERN |
| 18 | 59.36 | 17.97 | 0.21 | STOCKHOLM |
| 19 | 48.25 | 16.82 | 0.19 | VIENNA |
| 20 | 55.68 | 12.54 | 0.16 | COPENHAGEN |
| 21 | 59.91 | 10.77 | 0.13 | OSLO |
| 22 | 60.22 | 24.83 | 0.12 | HELSINKI |
| 23 | 40.37 | -3.74 | 0.08 | MADRID |
| 24 | 41.39 | 2.07 | 0.08 | BARCELONA |
| 25 | 50.07 | 14.36 | 0.05 | PRAGUE |
| 26 | 37.30 | -6.00 | 0.04 | SEVILLE |
| 27 | 36.70 | -4.56 | 0.04 | MALAGA |
| 28 | 39.45 | -0.40 | 0.04 | VALENCIA |
| 29 | 41.66 | -0.97 | 0.04 | ZARAGOSA |
| 30 | 49.66 | 6.09 | 0.01 | LUXEMBOURG |

FIG. 1

| PARAMETER | VALUE |
|---|---|
| SEMI-MAJOR AXIS | 42,164 km |
| APOGEE ALTITUDE | 49,279 km |
| PERIGEE ALTITUDE | 22,294 km |
| INCLINATION | 55 DEG |
| ECCENTRICITY | 0.32 |
| ARGUMENT OF PERIGEE | 270 DEG |
| LONGITUDE OF THE ASCENDING NODE | 43 DEG EAST |
| LONG. OF GROUND TRACK AT MAX. LAT. | 7 DEG EAST |

EQUATION 1
$$J = \sum_{i=1}^{30} \bar{v}_i \times w_i$$

WHERE $\bar{v}_i$ IS AVERAGE VIEW ANGLE FROM THE $i_{th}$ CITY (ANGLE FROM LOCAL VERTICAL)

$w_i$ IS THE WEIGHT FOR THE $i_{th}$ CITY

WHERE THE WEIGHTS ARE NORMALIZED SUCH THAT

EQUATION 2
$$1 = \sum_{i=1}^{30} w_i$$

| CASE | BASELINE 8 S/C IN 12 HOUR ORBIT | ALTERNATIVE 1 5 S/C IN 24 HOUR ORBIT | ALTERNATIVE 2 6 S/C IN 24 HOUR ORBIT |
|---|---|---|---|
| ALL S/C OPERATING | $J=7.4, \theta_4=13$ $\theta_{14}=16, \theta_{30}=23$ | $J=6.2, \theta_4=9$ $\theta_{14}=15, \theta_{30}=19$ | $J=5.7, \theta_4=9$ $\theta_{14}=14, \theta_{30}=18$ |
| ONE S/C FAILED | $J=8.5, \theta_4=21$ $\theta_{14}=25, \theta_{30}=31$ | $J=7.4, \theta_4=21$ $\theta_{14}=25, \theta_{30}=31$ | $J=6.4, \theta_4=15$ $\theta_{14}=18, \theta_{30}=25$ |
| SERVICE INTRODUCTION | $J=11.9, \theta_4=21$ $\theta_{14}=25, \theta_{30}=31$ | $J=8.6, \theta_4=21$ $\theta_{14}=25, \theta_{30}=31$ | $J=7.8, \theta_4=15$ $\theta_{14}=18, \theta_{30}=25$ |

CONSTELLATION OF SPACECRAFT, AND BROADCASTING METHOD USING SAID CONSTELLATION

This application claims the priority of Provisional application 60/356,775 filed Feb. 15, 2002.

FIELD OF THE INVENTION

This invention relates to spacecraft constellations for broadcast communication purposes, and more specifically to spacecraft constellations which are particularly suited to broadcast service to particular portions of a heavenly body.

BACKGROUND OF THE INVENTION

Space-based Digital Audio Broadcast (DAB) systems provide a new type of service for distribution of CD-quality radio broadcast to mobile users such as automobiles and trucks. A salient property of Digital Audio Broadcast service is that it can be provided over a large geographic area when delivered from an overhead satellite.

Several digital Audio Broadcast systems are in use to provide service to the continental United States (CONUS). The service operated by XM Radio uses two geosynchronous-orbit spacecraft. Ideally, the DAB transmitter is located directly overhead of all mobile units to which service is provided, so as to prevent shadowing of the signal by adjacent structures or geographic features such as hills or mountains. With a location directly overhead, signal would be lost only when the vehicle passes through a tunnel or into a structure. A disadvantage of the use of geosynchronous spacecraft is that the required orbit is such that for northern latitude coverage, the elevation angle of the spacecraft as seen from potential users may be less than 60°, where the elevation angle is measured from the horizon. Thus, the XM Radio system has a potential for significant signal loss or shadowing, corresponding to loss of service, for at least some users or subscribers in northern latitudes. This can be corrected by the use of terrestrial repeaters, but such repeaters undesirably increase the cost and complexity of the system.

The DAB system operated by Sirius Radio, on the other hand, uses three spacecraft in highly elliptical inclined (HEO) "Tundra" orbits. This orbit has an inclination of 63.4° and eccentricity of 0.27, as it was originally developed to reduce orbital perturbations when providing service to Russia.

It has been determined that a Digital Audio Broadcast system should provide user-to-spacecraft elevation angles of no less than 70° over its service area in order to maximize user satisfaction. When applied to DAB service for Europe, the high orbit inclination of 64.3° results in poor elevation angle performance to users in central and southern Europe. Modified Molniya orbits have been proposed for DAB service to Europe, using eight spacecraft in twelve-hour orbits and an argument of perigee of about 240°.

Improved DAB systems are desired.

SUMMARY OF THE INVENTION

A constellation according to an aspect of the invention includes a plurality of spacecraft, each in its own approximately 24-hour orbit. Each of the orbits has an inclination in the range from about 50° to about 58°, an eccentricity in the range of about 0.28 to 0.36, and longitude of the ascending node in the range of 33° East to 53° East. Preferred constellations have ground tracks which move monotonically from East to West when above about 30° North latitude. In a most preferred constellation, the inclination is about 55°, and each of the orbits has a semi-major axis of about 42,000 km, longitude of the ascending node of about 43° East, argument of the perigee is about 270°, and longitude of the ground track at maximum latitude of about 7° East.

A constellation according to an aspect of the invention includes a plurality of spacecraft, each of which has broadcast capability. Each of the spacecraft is in its own approximately 24-hour orbit. Each of the orbits has an inclination of about 55° and an eccentricity of about 0.32, and each of the orbits also has a semi-major axis of about 42,000 km, longitude of the ascending node of about 43° East, argument of the perigee of about 270°, and longitude of the ground track at maximum latitude of about 7° East. According to another view of the invention, each of the approximately-24-hour orbits has an inclination of about 55°, apogee altitude of about 49,300 km, and perigee altitude of about 22,300 km, longitude of the ascending node of about 43° East, argument of the perigee of about 270°, and longitude of the ground track at maximum latitude of about 7° East.

In particular variants of this aspect of the invention, (a) the plurality is three, and the orbits of the spacecraft are selected to bring each of the spacecraft to apogee at time increments of about eight hours, (b) the plurality is four, and the orbits of the spacecraft are selected to bring each of the spacecraft to apogee at time increments of about six hours, (c) the plurality is five, and the orbits of the spacecraft are selected to bring each of the spacecraft to apogee at time increments of about four hours fifty minutes, and (d) the plurality is six, and the orbits of the spacecraft are selected to bring each of the spacecraft to apogee at time increments of about four hours.

A method according to another aspect of the invention is for broadcasting to European cities. In the method according to this aspect of the invention, a plurality of broadcast spacecraft are placed in similar approximately-24-hour orbits, which may be rotated relative to each other. Each of the orbits has an inclination of about 55° and an eccentricity of about 0.32, and each of the orbits also has a semi-major axis of about 42,000 km, longitude of the ascending node of about 43° East, argument of perigee of about 270°, and longitude of the ground track at maximum latitude of about 7° East. According to this method, the spacecraft broadcast during those times when their ground tracks are above about 30° to 35° latitude, and the broadcast power is reduced during other times. In one version, reduction of power is complete, so that the broadcast portion of the operation of the spacecraft ceases during those other times. According to an aspect of this method, all of the spacecraft provide for multiplex operation. That is, the spacecraft broadcast using at least one of frequency-, code, and time-division multiplex, so that the broadcast signals of each spacecraft can be separated by use of that one or ones of said frequency, code, and time division unique to that spacecraft.

A specific method for broadcasting according to an aspect of the invention includes the step of placing more than two broadcast spacecraft in similar approximately-24-hour orbits, spaced so that they arrive at apogee at time increments equal to the orbital period divided by the number of spacecraft. According to other aspects of the invention, the methods include the step of placing one of three, four, five, and six broadcast spacecraft in similar approximately-24-hour orbits.

BRIEF DESCRIPTION OF THE DRAWING

FIG. 1 is a table listing various cities in a European Digital Audio Broadcast coverage area, together with weights assigned based on population;

FIG. 8 tabulates summarized results of evaluations of various orbits.

DESCRIPTION OF THE INVENTION

The Tundra orbit, when applied to Digital Audio Broadcast service for Europe, results in sub-optimal coverage, with low user-to-spacecraft elevation angles in the most populated regions. The proposal for use of eight spacecraft in modified Molniya orbits with 12-hour periods results in high system cost.

The inventor herein realized that the orbits of the spacecraft used for Digital Audio Broadcast service for Europe should maximize the elevation angles for the most populous cities, which are the most important cities from a commercial point of view. Desirable orbits were determined by assigning weights to various ones of the cities of Europe, based on population, corresponding to the ability to pay for service, and performing an optimization. The particular optimization which was used for this purpose was a constrained non-linear optimization. The table of FIG. 1 ranks the most important cities or regions for this purpose, their respective latitudes and longitudes, and the weighting factor applied to each. These major cities or regions are roughly included within a closed polygon having vertices at the cities of Glasgow, Copenhagen, Budapest, Naples, Valencia, and Madrid. This polygon includes the DAB markets associated with London, Paris, Munich, and Berlin.

The analysis associated with the optimization revealed that maximized elevation angle coverage of the European region, as represented by the cities and regions for which optimization was performed, would be obtained by 24-hour orbits with less inclination than a Tundra orbit, but with greater eccentricity. More particularly, the optimized orbits have an inclination of about 55°, less than the 63.4° of Tundra, but with an eccentricity of 0.32, which is larger than the Tundra eccentricity of 0.27. Such a 55° inclination, 0.32 eccentricity orbit according to the invention has a greater or longer dwell time over Europe than a less elliptical one with larger inclination. AS it happens, the orbit according to the invention also maximizes the coverage elevation angles to the cities in the table of FIG. 1, and simultaneously minimizes the number of spacecraft required to provide that coverage.

Figures 2, 3:
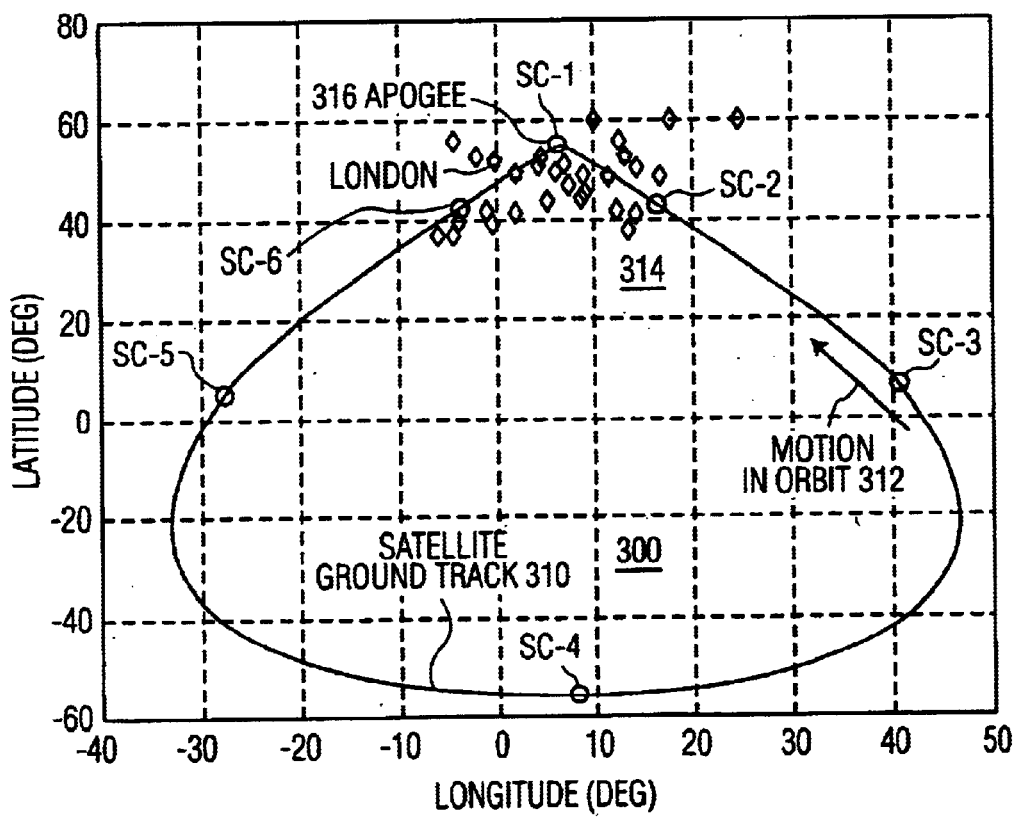
FIG. 2 is a table listing approximate values for various parameters of an orbit according to an aspect of the invention.
FIG. 3 is a representation of the ground track of a group of six spacecraft following an orbit or orbits according to an aspect of the invention, which traverse the relevant broadcast region generally from East to West, and showing the locations of certain cities relative to the track.

The semi-major axis, apogee altitude, perigee altitude, inclination, eccentricity, argument of perigee, and pertinent longitudes of orbits according to an aspect of the invention are listed in the table of FIG. 2. More particularly, the semi-major axis (half the major axis) of the orbit is theoretically 42,164 kilometers (km), the apogee altitude is 49,279 km, the perigee altitude is 22,294 km, the inclination is 55°, and the eccentricity is 0.32, the argument of perigee is 270°. The "argument of perigee" is the angle from the ascending node to the orbit perigee, where the "ascending node" is the longitude of that equator crossing at which the spacecraft traverses from the Southern to the Northern hemisphere. The longitude of the ascending node (where the ground track of the orbit crosses the equator going in a Northerly direction) is 43° East, and the longitude of the ground track at maximum latitude (the maximum northerly excursion) is 7° East. The ground track of an orbit according to an aspect of the invention is illustrated in FIG. 3. The ground track 310 of FIG. 3 represents the path taken by each spacecraft of the constellation 300, however many that may be. In FIG. 3, the number of spacecraft is six, and they are identified as circles designated SC-1, SC-2, SC-3, SC-4, SC-5, and SC-6, where a spacecraft is designated as SC. All six of the spacecraft follow the same orbital track, corresponding to ground track 310. In general, the orbit of each spacecraft, as illustrated in FIG. 3, crosses the equator (0° latitude) at roughly 43° East longitude in the northerly direction or "movement in orbit" indicated by arrow 312, which is termed the "ascending node." From the ascending node, the spacecraft enters the European coverage region, designated generally as 314. The apex or apogee 316 of the orbit occurs at 55° latitude and a longitude of roughly 7° East. In FIG. 3, the city of London is identified by name, and Paris, Munich and Berlin are identified by designations 2, 3, and 4, respectively. It can be seen that the spacecraft pass almost directly overhead of these cities. From apogee 316, the ground track of the orbit proceeds generally southerly, recrossing the equator in a southerly direction at about 30° West. The ground track 310 loops about "in" the southern hemisphere back to the ascending node. The six spacecraft SC-1, SC-2, SC-3, SC-4, SC-5, and SC-6 of FIG. 3 are illustrated at about the positions which they assume at the time that SC-1 is at apogee or apex 316.

While any number of spacecraft may be used in the constellation, at least three spacecraft are required in order to provide elevation angles greater than 70° in the European coverage region. The constellation of FIG. 3 includes six spacecraft. Since each spacecraft is in a 24-hour orbit, equal temporal spacing of the spacecraft places them 24/6=4 hours apart. In FIG. 3, each circle SC-1, SC-2, SC-3, SC-4, SC-5, and SC-6 represents a position of a spacecraft with a four-hour spacing. Thus, the spacecraft following an orbit having the ground track 310 of FIG. 3 come to apogee point 316 in a time succession corresponding to the numerical designation of the spacecraft; thus SC-1 is first in time, then SC-2, followed by SC-3, and so forth, at four-hour intervals. Twenty-four hours after the relative positions illustrated in FIG. 3, the illustrated positions recur.

Figure 4:
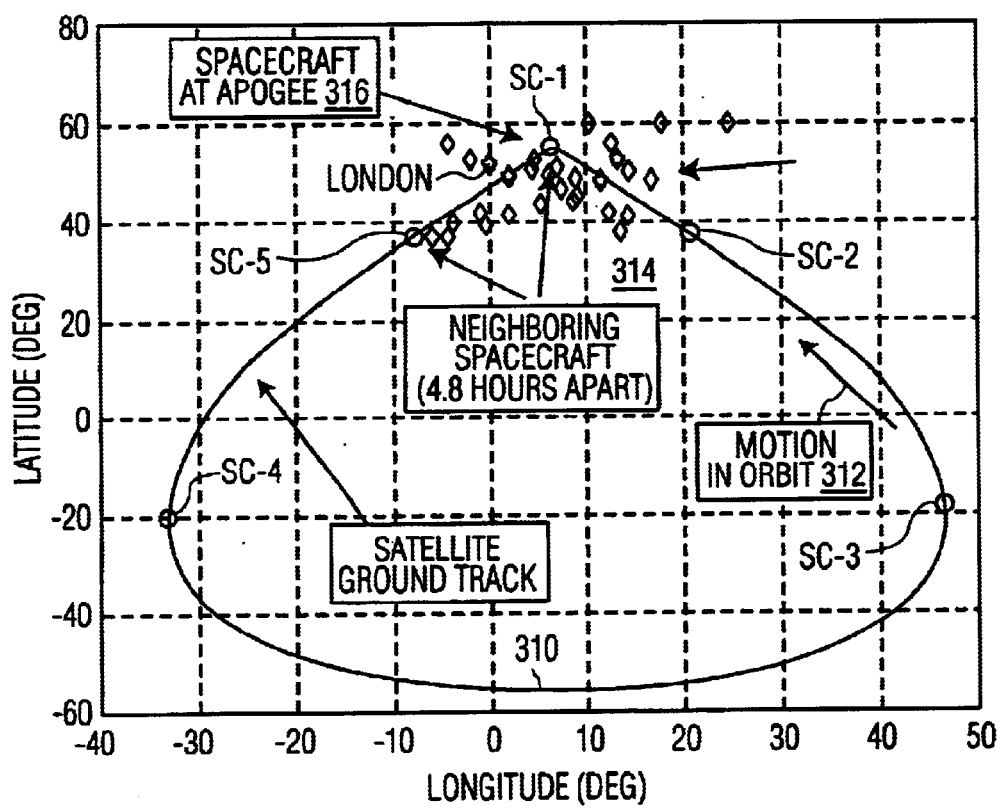
FIG. 4 is a representation of the ground track of a group of five spacecraft following an orbit or orbits according to an aspect of the invention, showing the locations of certain cities relative to the track.

FIG. 4 illustrates a ground track corresponding to that of FIG. 3, but with the difference that only five spacecraft are illustrated along the track. A constellation of five spacecraft, each in a 24-hour orbit, has temporal spacing between adjacent ones of the spacecraft of about 4.8 hours, corresponding to 4 hours 48 minutes (if the temporal spacing is equal).

A constellation of three spacecraft (ground track not illustrated) makes the temporal spacing eight hours, so they are eight hours apart on the ground track of FIG. 3 or 4. The ground track of such a constellation may be readily visualized as being that of FIG. 3 with every other spacecraft removed, thereby retaining SC-1, SC-3, and SC-5, for example. Thus, each spacecraft in a three-spacecraft constellation nominally provides eight hours of time over the coverage region. As one spacecraft leaves the coverage region, another enters the region. Consequently, during some of the "crossover" times coverage may be provided by two spacecraft, or by more than two spacecraft if the constellation includes more than three.

Figure 5A:
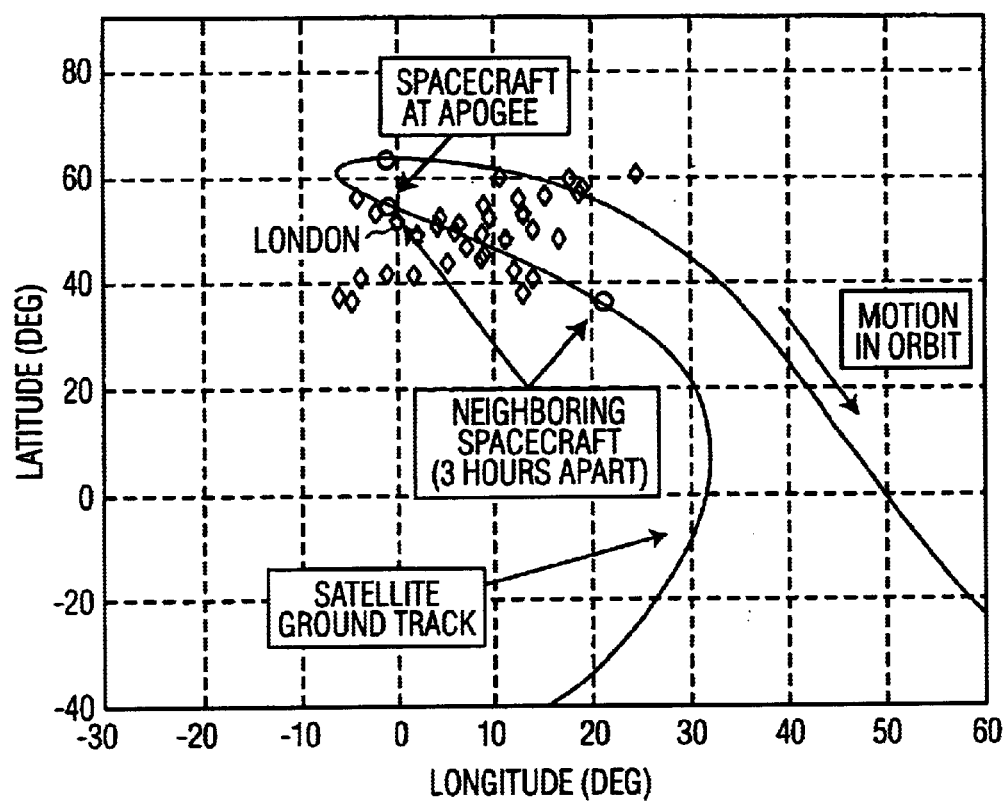
FIGS. 5a and 5b are representations of sub-optimal satellite ground tracks which reverse direction in the northern hemisphere.
Figure 5B:
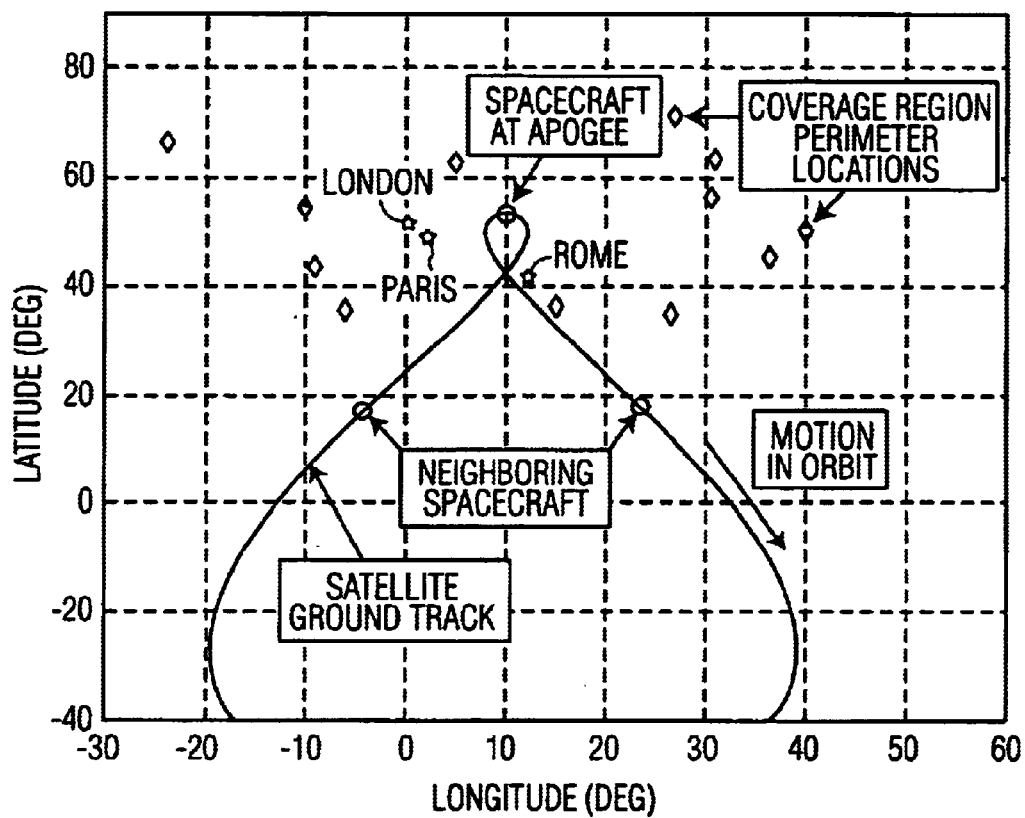

The ground tracks illustrated in FIGS. 3 and 4 have "teardrop" shapes which aid in distinguishing the orbits of the associated spacecraft from some other orbits. FIG. 5a illustrates the ground track associated with one sub-optimal orbit, namely the abovementioned 12-hour modified Molniya, in which the ground track reverses direction and then crosses itself before tending toward the equator, as illustrated in FIG. 5a. FIG. 5b illustrates the ground track for another suboptimal orbit, namely an orbit using four spacecraft with six-hour spacing. The orbit of FIG. 5b has an inclination of 53°, eccentricity of 0.20, and argument of perigee of 270°, with semimajor axis of 42164 km, apogee altitude of 44,219 km and perigee altitude of 27,353 km. As illustrated in FIG. 5b, the ground track exhibits a "loop" at its apex, with retrograde motion over a portion of the loop.

From the discussion associated with FIGS. 3 and 4, it will be appreciated that the spacecraft are almost directly overhead of the desired cities at a time when the spacecraft are at or near apogee, or the highest point in the orbit. At this time, the maximum spacing of each spacecraft from the European coverage region is about 49,000 km, corresponding to 30,450 miles. At such an altitude, more broadcast or transmitted electromagnetic power is required in order to achieve a given field strength at ground level than would be the case if the spacecraft were at perigee. Those skilled in the art know that operating power must be supplied to various portions of the electronics of the spacecraft in order to achieve the desired broadcast coverage with sufficient field strength. Otherwise, the signals arriving at the mobile radios would not be strong enough to give reliable or low-noise reception. In general, spacecraft do not use electrical generators such as those which are available to terrestrial transmitter. Spacecraft would not be able to carry sufficient fuel to operate a conventional rotary power generator for more than a short while, and in any case there is no air available in space which could be used as a source of oxygen with which to combust the fuel, so oxygen would additionally have to be carried on board the spacecraft. Considering the weight limitations on launch of spacecraft, other types of power supplies are commonly used in spacecraft. Often, electrical storage batteries are provided, but the batteries which can be carried on spacecraft cannot power the electrical broadcast equipment for more than a short time. Thus, spacecraft often rely solely on solar power panel(s) as their primary power source. In general, the batteries are used only to temporarily store excess energy from the solar panels for use at times when the solar panels cannot provide sufficient power. According to an aspect of the invention, at least some of the electrical broadcast equipment of each spacecraft used for broadcast purposes in an orbit according to another aspect of the invention is placed in a low- or no-power-consumption state during a portion of the orbit, thereby reducing the power load on the solar panel(s). This temporary reduction in the load on the solar panel(s) makes more excess power available, which can be stored in the batteries for use during peak power usage intervals, which according to an aspect of the invention include those intervals in which the electrical broadcast equipment is powered-up and broadcasting occurs. According to this aspect of the invention, the low- or no-power-consumption portion of the orbit includes those portions in which the ground track lies in the southern hemisphere, and the powered portion of the orbit includes those portions of the orbit which lie above 30° North latitude, and preferably above 35° North latitude. Such a power-limiting arrangement is particularly useful for DAB service to Europe.

Figures 6, 7:
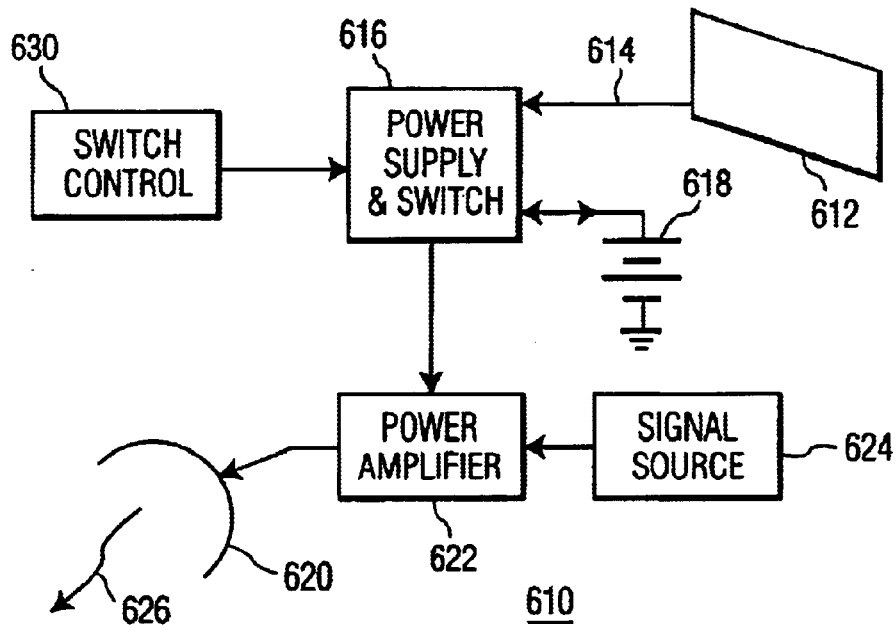
FIG. 6 is a highly simplified block diagram of the power source, power supply, and broadcast control portions of a spacecraft according to an aspect of the invention.
FIG. 7 sets forth equations useful in making determinations about optimal orbits.

FIG. 6 is a highly simplified block diagram of electrical portions of a spacecraft. In FIG. 6, the spacecraft 610 includes a power source in the form of a solar panel which is connected by way of paths 614 and a power conditioner/controller (power supply/switch) 616 to a battery 618. Such power conditioners/controllers are known in the art, being termed a "power regulation unit" (PRU) in Lockheed Martin A2100 spacecraft. An electromagnetic signal transmission arrangement is illustrated as including an antenna 620 fed from a power amplifier 622. A signal source 624 produces signals to be transmitted, and supplies those signals to amplifier 622, which amplifies the signals, and which may also process the signals to be transmitted by frequency translation, filtering, coding, time-multiplexing, or other processing. The signals to be transmitted are provided to antenna 620, which transduces the signals into a transmitted beam suggested by the "lightning bolt" symbol 626. Signal source block 624 may include memory for at least temporary storage of some of the signals to be transmitted. Signal block 624 may also include some arrangement for receiving signals from one or more ground stations for retransmission from the spacecraft 610 in a "bent pipe" operating mode. Such an arrangement for receiving signals may include an antenna, which may be associated with antenna 626 or which may be a separate antenna, together with appropriate receiver(s), controls and security verification. In one possible bent-pipe operating mode, signals are transmitted from the ground to the spacecraft in a given frequency range, such as in C or Ku band, and retransmitted from the spacecraft toward the ground at a different frequency, such as L-band. In such bent-pipe operation, the signals are coded at the ground before transmission to the spacecraft, in order to provide for multiplexing.

In operation of the spacecraft 610 of FIG. 6 in an orbit according to an aspect of the invention, power supply and switch block 616 operates so as to couple power from solar panel 612 to power amplifier 622 (and any other power-consuming equipment associated with the broadcasting function) during those intervals in which the power draw of amplifier 622 (and any ancillary equipment) is less than the power available from solar panel 612, and so as to additionally couple power from battery 618 to power amplifier 622 during those intervals in which the power draw of power amplifier 622 is greater than the amount of power available from solar panel 612. In addition, a switch control unit, designated 630 in FIG. 6, controls power supply and switch block 616 so as to disable power, or at least reduce power, to amplifier 622 (and ancillary broadcast equipment) during those intervals in which the spacecraft is in the southern hemisphere, and also preferably during at least a portion of those intervals during which the spacecraft ground track lies below 30°, and most preferably 35°, North latitude. This limits the main power-consuming electrical drain of the broadcast system to those portions of the orbit in which they are most needed. In turn, this allows a substantial portion of the orbit to be used for charging of the battery 618, if desired. The advantages of this type of operation can be taken advantage of by providing the spacecraft with a smaller solar panel than would otherwise be required, or with more powerful broadcast equipment than would be possible if the equipment were to be constantly in operation.

The controller illustrated as block 630 in FIG. 6 may include a radio receiver which responds to uplinked commands to enable or disable the power amplifier 622, or it may include autonomous equipment which determines the location of the spacecraft inertially, from models of the orbit together with attitude and other sensors, or by the use of global positioning service (GPS) receivers. Such an autonomous apparatus must be reprogrammable, so that the location can be changed at which power amplifier 622 switches from enabled to low-power or disabled and vice versa, because failure of one or more of the spacecraft of a given constellation might require that non-failed units of the constellation begin broadcast sooner as they approach the coverage region, and end broadcast later, than if all the spacecraft of the constellation were operational.

Since more than one spacecraft of the constellation may be transmitting at a given time, the mobile receiver user may receive signals from more than one spacecraft at a given time. Since the distance of the various spacecraft from the user will in general not be the same, and in any case both the spacecraft and the user are in relative motion, it can be expected that the signals from the various spacecraft will not arrive at a given user at the same time. If the same information were to be transmitted for arrival at the receiver at different times, some form of distortion, such as time-delay or "echo" distortion, is expected. According to an aspect of the invention, the broadcasts from the various spacecraft are rendered separable by use of at least one of frequency division multiplex, code division multiplex, or temporal or time-division multiplex. In the frequency division multiplex scheme, each of the spacecraft which transmits at a given time within the broadcast region transmits at a frequency different from that of any of the other spacecraft so broadcasting. For example, if there were six spacecraft in a constellation, of which three (SC-6, SC-1, SC-2) were to broadcast at any one time, the spacecraft at the apogee 316, as for example spacecraft SC-1 of FIG. 3, would broadcast at a first frequency or frequency range F1, spacecraft SC-2, just entering the coverage area, would broadcast at a second frequency F2, and spacecraft SC-3, just leaving the broadcast region, would have been transmitting at a third frequency F3. When spacecraft SC-3 ceases broadcasting, and another spacecraft, such as SC-4, enters the broadcast region, it would begin its broadcast in frequency range F3, made available by the cessation of broadcasting by SC-3. Similarly, when spacecraft SC-1 were to finally leave the broadcast region, it would cease broadcasting in frequency range F1, which frequency would then become available for use by spacecraft SC-5 when it enters the broadcast region. Thus, the number of operating frequencies can be less than the number of spacecraft. In the situation in which the constellation includes three spacecraft, only one spacecraft is in position to broadcast at any one time, so frequency, code, or time division multiplex is not needed. With four or more spacecraft, at least two different frequencies, codes or time division multiplex channels are needed. In the situation with six spacecraft in the constellation and three frequencies, codes or time multiplex channels, each spacecraft would have to be able to transmit at its selected frequency, code or time, as for example SC-1 at frequency (or code or time) F1, SC-2 at F2, SC-3 at F3, SC-4 at F1, SC-5 at F2, and SC-6 at F3. With five spacecraft in the constellation, at least some of the spacecraft will need to switch from one frequency (or code or time) to another to maintain separable channels.

The preferred mode of operation of the various spacecraft of the constellation is the "bent-pipe" mode, at least in part because all of the coding required for multiplex operation can be performed on the ground before transmission of the signals to the spacecraft for retransmission.

The orbits according to the orbit aspect of the invention were determined by a comparison of two alternatives against a baseline provided by a customer. The comparison included issues of view angle, and the cost of the spacecraft plus the cost of launch of the spacecraft. The baseline included eight spacecraft in 12-hour modified Molniya orbits. The optimization was performed by minimization of the average weighted view angle given by Equation 1 of FIG. 7, with the indicated average view angle, which can be determined for each city, and with the weight from each city as set forth in the table of FIG. 1, where the weights are normalized in accordance with Equation 2 of FIG. 7. It should be noted that the top four cities, namely London, Munich, Berlin, and Paris, represent 37% of the DAB market. The next ten cities, which are Glasgow, Birmingham, Amsterdam, Dusseldorf, Stuttgart, Marseille, Milan, Rome, Naples and Brussels, represent 45% of the market, so that the first 14 cities represent 82% of the market. Other cities on the list amount to only 18% of the DAB market. The solution of equation 1 is obtained by non-linear constrained optimization. The resulting orbital parameters are given in the table of FIG. 2.

A comparison of the characteristics of orbits according to an aspect of the invention with those of the baseline 8 spacecraft in 12-hour orbits. The performance comparison is based on the metrics (a) J, where J is the average weighted view angle over 24 hours for all 30 cities of the table of FIG. 1, (b) $\theta_4$ is the maximum view angle for the top four cities or 37% of the market, where "view angle" is the angle from local vertical $\theta$ and $\theta=0$ is directly overhead, (c) $\theta_{14}$ is the maximum view angle for the top 14 cities (82% of the market), and (d) $\theta_{30}$ is the maximum view angle for all 30 cities (100% of the market). It should be noted that the definition of $\theta$ set forth above differs from standard definitions of elevation angle, but is more directly useful in the present context. The comparison of the characteristics of the various orbits is made in one regard with the assumptions that all spacecraft of the constellation are operational, and that one of the spacecraft of the constellation is failed. Another consideration which is evaluated is the quality of service possible during an introductory phase when not all spacecraft of the constellation are available. Service-introduction with three and with four spacecraft are considered. FIG. 8 summarizes these results.

In FIG. 8, when all spacecraft are operating, the values of J, the average weighted view angle over 24 hours for all cities, has a value of 7.4° for the baseline of eight spacecraft in 12-hour modified Molniya orbits, and has lower values of 6.2° for alternative 1 (five spacecraft in 24 hour orbit according to an aspect of the invention) and 5.7° for alternative 2 (six spacecraft in 24 hour orbit according to an aspect of the invention). The values for the alternatives according to various aspects of the invention are superior to the baseline. Similarly, when all the spacecraft are operating, the $\theta_4$, $\theta_{14}$, and $\theta_{30}$ for alternatives 1 and 2 are superior (lower in value) than for the baseline. Similarly, the values of J are better (lower) for the alternatives 1 and 2 listed in FIG. 8 than for the baseline both for both the situations of one spacecraft failed and for service introduction. The values listed for $\theta_4$, $\theta_{14}$, and $\theta_{30}$ for any of alternatives 1 and 2 in either the one-spacecraft-failed or service introduction scenarios are in no case greater than, and in many cases less than, the corresponding values for the baseline. Put more generally, the performance of alternative 1 is about comparable to the baseline, in that view angles are less than about 19° by comparison with 23°, and the failure performance is also about the same. Alternative 2, however, is substantially better than the baseline, in that the view angles are less than 18° versus (vs) 23° with all spacecraft operational, and are within 25° vs 31° with one spacecraft failed. In addition, alternative 2 facilitates early service introduction, because its performance with three spacecraft is similar to that of the baseline with all eight spacecraft operating.

Consideration of the cost of buying or fabricating the spacecraft and of launch does not affect the primacy of alternative 2 over the baseline. In particular, the baseline requires eight spacecraft, and alternative 2 requires only six, so the cost of both purchase and the cost of launch are less for alternative 2. It should be noted that the spacecraft according to some aspects of the invention have orbits which may be viewed as being rotated to different planes, or which may be viewed as being relatively time-delayed along the same ground track. If separate launches are used, it is easy to place the spacecraft in the desired planes. If a single vehicle launches two or more spacecraft, then separate maneuvers must be used to select the appropriate planes. In this regard, alternative 1 can be rolled out with as few as two launches, namely a single launch into a first plane, and a dual launch into a second plane, with 36° nodal rotations of each of the two spacecraft of the dual launch, to leave the orbit planes separated by 72°. The spacecraft will not be equally spaced in the ground track during service introduction for alternative 1.

Other embodiments of the invention will be apparent to those skilled in the art. For example, the temporal spacing of the various spacecraft along the ground track has been described as being equal. However, the operation of a system such as that described is not dependent upon exact time spacing. Also, the orbital parameters have been given as single values, rather than in ranges. It is believed that orbits suitable for use in accordance with aspects of the invention may have inclinations ranging from about 50° to about 60°, eccentricity ranging from about 0.28 to about 0.36, and longitude of the ascending node in the range of about 33° East to about 53° East.

Thus, a constellation (300) according to an aspect of the invention includes a plurality of spacecraft (SC), each in its own approximately 24-hour orbit. Each of the orbits has an inclination in the range from about 50° to about 58°, an eccentricity in the range of about 0.28 to 0.36, and longitude of the ascending node in the range of 33° East to 53° East. Preferred constellations have ground tracks which move monotonically from East to West when above about 30° North latitude. In a most preferred constellation, the inclination is about 55°, and each of the orbits has a semi-major axis of about 42,000 km, longitude of the ascending node of about 43° East, argument of the perigee is about 270°, and longitude of the ground track at maximum latitude of about 7° East.

Further, a constellation (300) according to an aspect of the invention includes a plurality of spacecraft (SC), each of which has broadcast capability. Each of the spacecraft (SC) is in its own approximately 24-hour orbit. Each of the orbits has an inclination of about 55° and an eccentricity of about 0.32, and each of the orbits also has a semi-major axis of about 42,000 km, longitude of the ascending node of about 43° East, argument of the perigee of about 270°, and longitude of the ground track at maximum latitude of about 7° East. According to another view of the invention, each of the approximately-24-hour orbits has an inclination of about 55°, apogee altitude of about 49,300 km, and perigee altitude of about 22,300 km, longitude of the ascending node of about 43° East, argument of the perigee of about 270°, and longitude of the ground track at maximum latitude of about 7° East.

In particular variants of this aspect of the invention, (a) the plurality of spacecraft (SC) is three, and the orbits of the spacecraft (SC) are selected to bring each of the spacecraft (SC) to apogee (316) at time increments of about eight hours, (b) the plurality is four, and the orbits of the spacecraft (SC) are selected to bring each of the spacecraft (SC) to apogee (316) at time increments of about six hours, (c) the plurality is five, and the orbits of the spacecraft (SC) are selected to bring each of the spacecraft (SC) to apogee (316) at time increments of about four hours fifty minutes, and (d) the plurality is six, and the orbits of the spacecraft (SC) are selected to bring each of the spacecraft (SC) to apogee (316) at time increments of about four hours.

A method according to another aspect of the invention is for broadcasting to European cities. In the method according to this aspect of the invention, a plurality of broadcast spacecraft (SC) are placed in similar approximately-24-hour orbits, which may be rotated relative to each other. Each of the orbits has an inclination of about 55° and an eccentricity of about 0.32, and each of the orbits also has a semi-major axis of about 42,000 km, longitude of the ascending node of about 43° East, argument of perigee of about 270°, and longitude of the ground track at maximum latitude of about 7° East. According to this method, the spacecraft (SC) broadcast during those times when their ground tracks are above about 30° to 35° latitude, and the broadcast power is reduced during other times. In one version, reduction of power is complete, so that the broadcast portion of the operation of the spacecraft (SC) ceases during those other times. According to an aspect of this method, all of the spacecraft (SC) provide for multiplex operation. That is, the spacecraft (SC) broadcast using at least one of frequency-, code, and time-division multiplex, so that the broadcast signals of each spacecraft (SC) can be separated by use of that one or ones of said frequency, code, and time division unique to that spacecraft (SC).

A specific method for broadcasting according to an aspect of the invention includes the step of placing more than two broadcast spacecraft (SC) in similar approximately-24-hour orbits, spaced so that they arrive at apogee at time increments equal to the orbital period divided by the number of spacecraft (SC). According to other aspects of the invention, the methods include the step of placing one of three, four, five, and six broadcast spacecraft (SC) in similar approximately-24-hour orbits.

What is claimed is:

1. A constellation, comprising:
   a plurality of spacecraft, each in its own approximately 24-hour orbit, each of said orbits having an inclination in the range from about 50° to about 58° and an eccentricity in the range of greater than about 0.30 to about 0.36, and longitude of the ascending node in the range of 33° East to 53° East.

2. A constellation, comprising;
   a plurality of spacecraft, each in its own approximately 24-hour orbit, each of said orbits having an inclination in the range from about 50° to about 58° and an eccentricity in the range of about 0.28 to 0.36, and longitude of the ascending node in the range of 33° East to 530 East; wherein
   each of said orbits has a semi-major axis of about 42,000 km when said inclination is about 55°, longitude of the ascending node of about 43° East, argument of the perigee is about 270°, and longitude of the ground track at maximum latitude of about 7° East.

3. A constellation according to claim 1, wherein the ground track of each of said orbits moves from East to West monotonically above about 30° North latitude.

4. A constellation, comprising:

a plurality of spacecraft, each including a broadcast capability, and each in its own approximately 24-hour orbit, each of said orbits having an inclination of about 55° and an eccentricity of about 0.32, and each of said orbits also having a semi-major axis of about 42,000 kin, longitude of the ascending node of about 43° East, argument of the perigee of about 270°, and longitude of the ground track at maximum latitude of about 7° East.

5. A constellation according to claim 4, wherein each of said orbits has apogee altitude of about 49,300 km and perigee altitude of about 22,300 km.

6. A constellation according to claim 4, wherein said plurality is three, and the orbits of said spacecraft are selected to bring each of said spacecraft to apogee at time increments of about eight hours.

7. A constellation according to claim 4, wherein said plurality is four, and the orbits of said spacecraft are selected to bring each of said spacecraft to apogee at time increments of about six hours.

8. A constellation according to claim 4, wherein said plurality is five, and the orbits of said spacecraft are selected to bring each of said spacecraft to apogee at time increments of about four hours fifty minutes.

9. A constellation according to claim 4, wherein said plurality is six, and the orbits of said spacecraft are selected to bring each of said spacecraft to apogee at time increments of about four hours.

10. A constellation, comprising:

a plurality of spacecraft, each including a broadcast capability, and each in its own approximately 24-hour orbit, each of said orbits having an inclination of about 55°, apogee altitude of about 49,300 km, and perigee altitude of about 22,300 km, longitude of the ascending node of about 43° East, argument of the perigee of about 270°, and longitude of the ground track at maximum latitude of about 7° East.

11. A constellation according to claim 10, wherein each of said orbits has a semi-major axis of about 42,000 km and an eccentricity of about 0.32.

12. A method for broadcasting to European cities, said method comprising the steps of:

placing a plurality of broadcast spacecraft in similar approximately-24-hour orbits, which may be rotated relative to each other, each of said orbits having an inclination of about 55° and an eccentricity of about 0.32, and each of said orbits also having a semi-major axis of about 42,00.0 km, longitude of the ascending node of about 43° East, argument of the perigee of about 270°, and longitude of the ground track at maximum latitude of about 7° East;

broadcasting from each of said spacecraft during those times when the ground track of said spacecraft is above about 30° to 35° latitude, and reducing the broadcast power during other times.

13. A method according to claim 12, wherein said step of reducing the broadcast power includes the step of cessation of broadcast.

14. A method for broadcasting according to claim 12, wherein plural ones of said spacecraft broadcast simultaneously using one of different (a) frequency ranges, (b) time-division multiplex slots, and (c) code-division multiplex codes.

15. A method for broadcasting according to claim 12, wherein said constellation has more than two broadcast spacecraft.

16. A method for broadcasting according to claim 14, wherein said constellation contains three spacecraft, and the orbit of each of said spacecraft is selected to bring a spacecraft to apogee approximately every eight hours.

17. A method for broadcasting according to claim 14, wherein said constellation contains four spacecraft, and the orbit of each of said spacecraft is selected to bring a spacecraft to apogee approximately every six hours.

18. A method for broadcasting according to claim 14, wherein said constellation contains five spacecraft, and the orbit of each of said spacecraft is selected to bring a spacecraft to apogee approximately every four hours fifty minutes.

19. A method for broadcasting according to claim 14, wherein said constellation contains six spacecraft, and the orbit of each of said spacecraft is selected to bring a spacecraft to apogee approximately every four hours.

* * * * *

(12) EX PARTE REEXAMINATION CERTIFICATE (6387th)
United States Patent
Goodzeit

(10) Number: US 6,851,651 C1
(45) Certificate Issued: Aug. 19, 2008

(54) CONSTELLATION OF SPACECRAFT, AND BROADCASTING METHOD USING SAID CONSTELLATION

(75) Inventor: Neil Evan Goodzeit, Princeton, NJ (US)

(73) Assignee: Lockheed Martin Corporation, Bethesda, MD (US)

Reexamination Request:
No. 90/008,076, Jul. 5, 2006

Reexamination Certificate for:
Patent No.: 6,851,651
Issued: Feb. 8, 2005
Appl. No.: 10/176,936
Filed: Jun. 21, 2002

Related U.S. Application Data

(60) Provisional application No. 60/356,775, filed on Feb. 15, 2002.

(51) Int. Cl.
*B64G 9/00* (2006.01)

(52) U.S. Cl. .................. 244/185.4; 244/164; 244/171; 455/427

(58) Field of Classification Search ............... 244/158.4; 455/12.1, 13.2
See application file for complete search history.

(56) References Cited

U.S. PATENT DOCUMENTS

| 5,319,673 A | 6/1994 | Briskman |
| 6,223,019 B1 | 4/2001 | Briskman et al. |
| 6,442,385 B1 | 8/2002 | Marko |
| 6,795,687 B1 | 9/2004 | Castiel et al. |

OTHER PUBLICATIONS

Bachtell, et al, "Satellite Voice Broadcast System Study," dated Aug. 1985 for Lewis Research Center, National Aeronautics and Space Administration, Cleveland, Ohio 20546.
Chobotov, Vladimir A., Editor, "Orbital Mechanics," 1991, published by the American Institute of Aeronautics and Astronautics, Inc., Washington, D.C. 20024–2518, p. 36.
Bousquet, et al., "Orbital Aspects and Useful Relations from Earth Satellite Geometry in the Frame of Future Mobile Satellite Systems," American Institute of Aeronautics, 1990.
Chobotov, Vladimir A., Editor, "Orbital Mechanics," 1991, published by the American Institute of Aeronautics and Astronautics, Inc., Washington, D.C. 20024–2518, p. 49.

*Primary Examiner*—Matthew C. Graham

(57) ABSTRACT

In general, a constellation of spacecraft is used to broadcast to a particular region with high angles of view in order to reduce blockage or shadowing. A constellation of a plurality of spacecraft is placed in 24-hour orbits having inclination of about 55°, eccentricity of about 0.32, semi-major axis of about 42,000 km, longitude of the ascending node of about 43° East, argument of perigee of about 270°, and longitude of the ground track at maximum latitude of about 7° East. The preferred number of spacecraft ranges from three to six. In a particular application of Digital Audio Broadcast to Europe in some embodiments, the most populous cities are provided with service from no more than about 10° from vertical, and broadcast takes place when the spacecraft are above at least 35° North latitude. The broadcast power is reduced during those portions of the orbit in which the ground track lies in the Southern hemisphere.

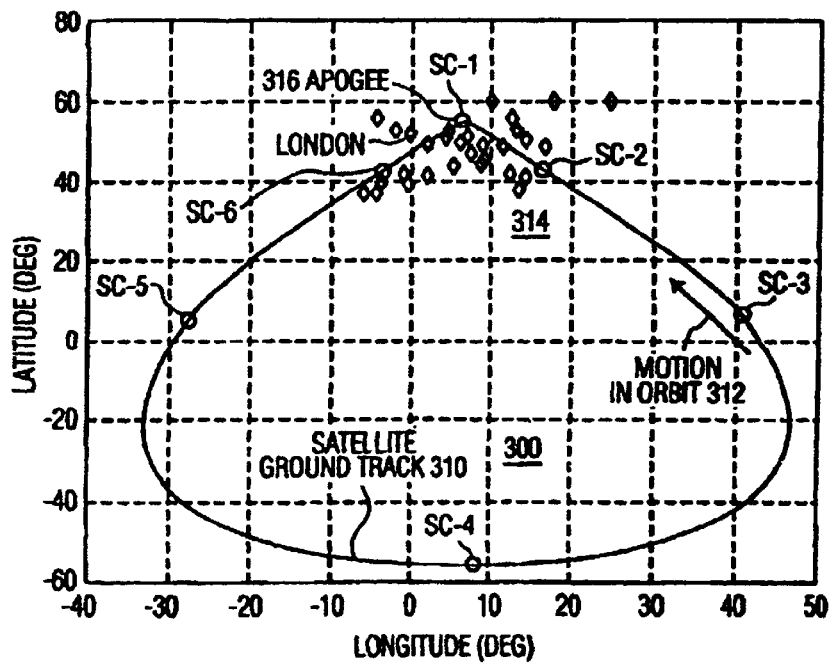

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 4, 10 and 12 are determined to be patentable as amended.

Claims 3, 5–9, 11 and 13–19, dependent on an amended claim, are determined to be patentable.

1. A constellation, comprising:
    a plurality of spacecraft, each in its own approximately 24-hour orbit, each of said orbits having an inclination in the range from about 50° to about 58° and an eccentricity in the range of greater than about 0.30 to about 0.36, and longitude of the ascending node in the range of 33° East to 53° East,
    *wherein the constellation has a weighted view angle over a 24 hour period from a predetermined number (N) of cities with predetermined weights of less than 7.4°,*
    *wherein the weighted view angle (J) is determined according to the equation*

$$J = \sum_{i=1}^{N} \bar{v}_i \times w_i,$$

*where $\bar{v}_i$ is an average view angle from one of the N cities, and $w_1$ is a predetermined weight for the one of the N cities, and*
    *wherein the predetermined weights for the predetermined number of cities are determined according to a relative market size of each of the predetermined number of cities.*

2. A constellation, comprising:
    a plurality of spacecraft, each in its own approximately 24-hour orbit, each of said orbits having an inclination in the range from about 50° to about 58° and an eccentricity in the range of about 0.28 to 0.36, and longitude of the ascending node in the range of 33° East to [530] *53°* East;
    wherein each of said orbits has a semi-major axis of about 42,000 km when said inclination is about 55°, *said* longitude of the ascending node [of] *is* about 43° East, argument of the perigee is about 270°, and longitude of the ground track at maximum latitude [of] *is* about 7° East,
    *wherein the constellation has a weighted view angle over a 24 hour period from a predetermined number (N) of cities with predetermined weights of less than 7.4°,*
    *wherein the weighted view angle (J) is determined according to the equation*

$$J = \sum_{i=1}^{N} \bar{v}_i \times w_i,$$

*where $\bar{v}_i$ is an average view angle from one of the predetermined number of cities, and $w_i$ is a predetermined weight for the one of the predetermined number of cities, and*
    *wherein the predetermined weights for the predetermined number of cities are determined according to a relative market size of each of the predetermined number of cities.*

4. A constellation, comprising:
    a plurality of spacecraft, each including a broadcast capability, and each in its own approximately 24-hour orbit, each of said orbits having an inclination of about 55° and an eccentricity of about 0.32, and each of said orbits also having a semi-major axis of about 42,000 [kin] *km*, longitude of the ascending node of about 43° East, argument of the perigee is about 270°, and longitude of the ground track at maximum latitude of about 7° East,
    *wherein the constellation has a weighted view angle over a 24 hour period from a predetermined number (N) of cities with predetermined weights of less than 7.4°,*
    *wherein the weighted view angle (J) is determined according to the equation*

$$J = \sum_{i=1}^{N} \bar{v}_i \times w_i,$$

*where $\bar{v}_i$ is an average view angle from one of the predetermined number of cities, and $w_i$ is a predetermined weight for the one of the predetermined number of cities, and*
    *wherein the predetermined weights for the predetermined number of cities are determined according to a relative market size of each of the predetermined number of cities.*

10. A constellation, comprising:
    a plurality of spacecraft, each including a broadcast capability, and each in its own approximately 24-hour orbit, each of said orbits having an inclination of about 55°, apogee altitude of about 49,300 km, and perigee altitude of about 22,300 km, longitude of the ascending node of about 43° East, argument of the perigee of about 270°, and longitude of the ground track at maximum latitude of about 7° East,
    *wherein the constellation has a weighted view angle over a 24 hour period from a predetermined number (N) of cities with predetermined weights of less than 7.4°,*
    *wherein the weighted view angle (J) is determined according to the equation*

$$J = \sum_{i=1}^{N} \bar{v}_i \times w_i,$$

*where $\bar{v}_i$ is an average view angle from one of the predetermined number of cities, and $w_i$ is a predetermined weight for the one of the predetermined number of cities, and*
    *wherein the predetermined weights for the predetermined number of cities are determined according to a relative market size of each of the predetermined number of cities.*

12. A method for broadcasting to European cities, said method comprising the steps of:
  placing a plurality of broadcast spacecraft in similar [approximately-24-hour] *approximately 24-hour* orbits, which may be rotated relative to each other, each of said orbits having an inclination of about 55° and an eccentricity of about 0.32, and each of said orbits also having a semi-major axis of about [42,00.0] *42,000 km*, longitude of the ascending node of about 43° East, argument of the perigee of about 270°, and longitude of the ground track at maximum latitude of about 7° East; and
  broadcasting from each of said spacecraft during those times when the ground track of said spacecraft is above about 30° to 35° latitude, and reducing the broadcast power during other times,
  *wherein the plurality of broadcast spacecraft have a weighted view angle over a 24 hour period from a predetermined number (N) of cities with predetermined weights of less than 7.4°,*
  *wherein the weighted view angle (J) is determined according to the equation*

$$J = \sum_{i=1}^{N} \bar{v}_i \times w_i,$$

*where $\bar{v}_i$ is an average view angle from one of the predetermined number of cities, and $w_i$ is a predetermined weight for the one of the predetermined number of cities, and*
  *wherein the predetermined weights for the predetermined number of cities are determined according to a relative market size of each of the predetermined number of cities.*

\* \* \* \* \*

(12) EX PARTE REEXAMINATION CERTIFICATE (6726th)
United States Patent
Goodzeit

(10) Number: US 6,851,651 C2
(45) Certificate Issued: Mar. 24, 2009

(54) CONSTELLATION OF SPACECRAFT, AND BROADCASTING METHOD USING SAID CONSTELLATION

(75) Inventor: Neil Evan Goodzeit, Princeton, NJ (US)

(73) Assignee: Lockheed Martin Corporation, Bethesda, MD (US)

Reexamination Request:
No. 90/009,220, Jul. 9, 2008

Reexamination Certificate for:
Patent No.: 6,851,651
Issued: Feb. 8, 2005
Appl. No.: 10/176,936
Filed: Jun. 21, 2002

Reexamination Certificate C1 6,851,651 issued Aug. 19, 2008

Related U.S. Application Data
(60) Provisional application No. 60/356,775, filed on Feb. 15, 2002.

(51) Int. Cl.
*B64G 1/10* (2006.01)
*B64G 1/24* (2006.01)
*B64G 1/00* (2006.01)
*B64G 9/00* (2006.01)
*H04B 7/19* (2006.01)

(52) U.S. Cl. ..................... 244/158.4; 244/164; 244/161; 455/427

(58) Field of Classification Search ........................ None
See application file for complete search history.

(56) References Cited
U.S. PATENT DOCUMENTS
6,223,019 B1  4/2001 Briskman et al.
6,442,385 B1  8/2002 Marko

OTHER PUBLICATIONS

Bachtell, et al., Satellite Voice Broadcast System Study, Aug. 1985, pp. 22–46, Lewis Research Ctr., Natl'l. Aeronautics & Space Admin, Cleveland Ohio.
Chobotov, Vladimir A., Editor, Orbital Mechanics, (1991), pp. 36,49, published by American Institute of Aeronautics, Inc. (AIA), Wash., D.C.
Bousquet, et al., Orbital Aspects and Useful Relations from Earth Satellite Geometry in the Frame of Future Mobile Satellite Systems, (1990) pp. 783–789, pub. by AIA, Wash.,DC.
Christopher, Paul F., Orbit Selection for Optimum Satellite System Performance, (1980) IEEE, pp. 30.5.1–30.5.8, pub. by The Mitre Corp., Bedford, MA.

*Primary Examiner*—Peter C. English

(57) ABSTRACT

In general, a constellation of spacecraft is used to broadcast to a particular region with high angles of view in order to reduce blockage or shadowing. A constellation of a plurality of spacecraft is placed in 24-hour orbits having inclination of about 55°, eccentricity of about 0.32, semi-major axis of about 42,000 km, longitude of the ascending node of about 43° East, argument of perigee of about 270°, and longitude of the ground track at maximum latitude of about 7° East. The preferred number of spacecraft ranges from three to six. In a particular application of Digital Audio Broadcast to Europe in some embodiments, the most populous cities are provided with service from no more than about 10° from vertical, and broadcast takes place when the spacecraft are above at least 35° North latitude. The broadcast power is reduced during those portions of the orbit in which the ground track lies in the Southern hemisphere.

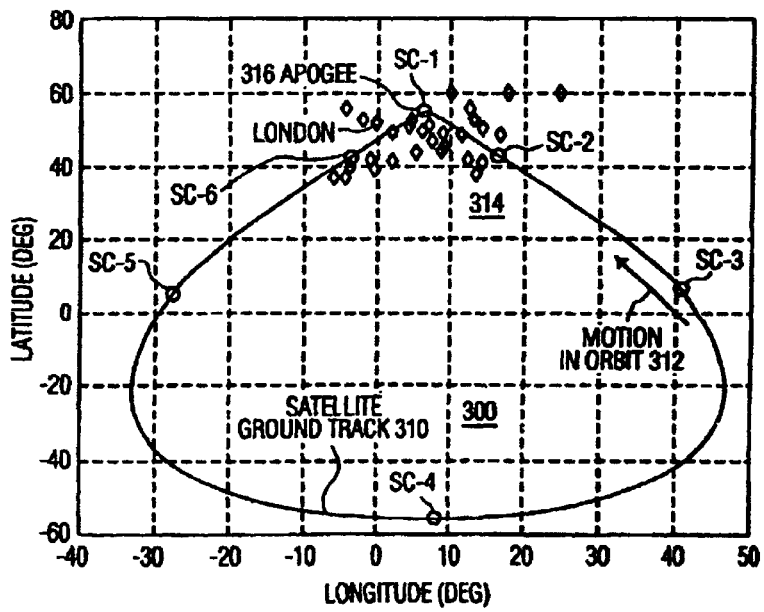

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–19 is confirmed.

* * * * *